United States Patent
Zhu et al.

(10) Patent No.: US 10,316,144 B2
(45) Date of Patent: Jun. 11, 2019

(54) SELENIUM-CONTAINING POLYIMIDE POLYMER, PREPARING METHOD AND USE THEREOF

(71) Applicant: SOOCHOW UNIVERSITY, Suzhou (CN)

(72) Inventors: Jian Zhu, Suzhou (CN); Qilong Li, Suzhou (CN); Chunlai Ding, Suzhou (CN); Huinan Jiang, Suzhou (CN); Xiulin Zhu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 15/576,890

(22) PCT Filed: Dec. 16, 2016

(86) PCT No.: PCT/CN2016/110235
§ 371 (c)(1),
(2) Date: Nov. 27, 2017

(87) PCT Pub. No.: WO2018/072291
PCT Pub. Date: Apr. 26, 2018

(65) Prior Publication Data
US 2019/0010290 A1     Jan. 10, 2019

(30) Foreign Application Priority Data
Oct. 20, 2016 (CN) .......................... 2016 1 0911322

(51) Int. Cl.
*C08G 73/10*     (2006.01)
*C07C 391/02*    (2006.01)
(Continued)

(52) U.S. Cl.
CPC ..... *C08G 73/1057* (2013.01); *C08G 73/1071* (2013.01); *C08J 5/18* (2013.01); *G02B 1/04* (2013.01); *C08J 2379/08* (2013.01)

(58) Field of Classification Search
CPC ....................................................... C08G 73/10
(Continued)

(56) References Cited

U.S. PATENT DOCUMENTS
2001/0005528 A1   6/2001  Lee et al.

FOREIGN PATENT DOCUMENTS
CN        1852941 A      10/2006
CN      101151302 A       3/2008
(Continued)

OTHER PUBLICATIONS

Zhang Shi-lu et al., Study on one-pot synthesis of diaryl selenides catalyzed by cuprous oxide, Chemical Research and Application, vol. 25, No. 12, Dec. 2013, pp. 1632-1638.

*Primary Examiner* — Duc Truong
(74) *Attorney, Agent, or Firm* — SZDC Law P.C.

(57) ABSTRACT

The invention provides a selenium-containing polyimide polymer, preparation method and use thereof. The method comprises: (1) polymerizing a selenide diamine monomer with a dianhydride monomer to give a selenium-containing polyamic acid; and (2) performing thermal imidization on the selenium-containing polyamic acid obtained in the step (1) to give a selenium-containing polyimide polymer. In the invention, selenium is introduced into polyimides for increasing refractive index to 1.7-1.82, this greatly improves the defects of low refractive index of the existing polyimide materials, thereby expanding its applications in the optics field.

10 Claims, 6 Drawing Sheets

(51) Int. Cl.
*C08J 5/18* (2006.01)
*G02B 1/04* (2006.01)
*C08L 79/08* (2006.01)

(58) Field of Classification Search
USPC .......................................................... 528/353
See application file for complete search history.

(56) References Cited

FOREIGN PATENT DOCUMENTS

SELENIUM-CONTAINING POLYIMIDE POLYMER, PREPARING METHOD AND USE THEREOF

This application is a PCT National Stage application of PCT/CN2016/110235, filed on Dec. 16, 2016, which claims priority to Chinese Patent Application No. 201610911322.0, filed on Oct. 20, 2016, which is incorporated by reference for all purposes as if fully set forth herein.

FIELD OF THE INVENTION

The present invention relates to a polymer material, and more particularly to a selenium-containing polyimide polymer, method for preparing the same and use thereof.

DESCRIPTION OF THE RELATED ART

Materials with high refractive index have the significant application value in the fields of optical materials, lenses and display, and the refractive index of a common material is relatively low, ranging from 1.3 to 1.70. Generally, a material having a refractive index of larger than 1.70 is referred to as a high refractive index material. High refractive index materials include two main types of polymer-based materials and inorganic hybrid materials. Polymer-based materials are mainly polymer resin materials and polymer-nanoparticle blending materials. Inorganic hybrid materials are mainly common inorganic glass materials and the like. High refractive index materials of polymer-based have properties such as lighter mass, better resistance to breakage and higher refractive index compared to inorganic hybrid materials. Recently, the inorganic hybrid materials used in optical devices have been gradually replaced by polymer-based materials, has become the focus of research in this field.

High refractive index polymers ($n>1.7$) are generally used as optical materials such as prisms, plastic lenses, LED sealing materials and anti-refraction coatings. For example, polyimide-titanium dioxidenanocrystal nanocomposite may be used as anti-refraction coating, polyphenylene sulfide is used as as micro lens of an image sensor, and phenylsiloxane is used as a LED sealing material. High refractive index polymer materials which have been currently reported are mainly: halogen-containing high refractive index polymers, phosphorus-containing high refractive index polymers, high refractive index polymers containing a large conjugated group in a side chain, selenium-containing hyperbranched polystyrene and sulfur-containing polyimide materials. Richard A. Minns et al. has reported a halogen-containing high refractive index polymer with a refractive index of 1.67-1.77. They have found that the refractive index value increases with the increase of halogen content in a side chain, and the effect obtained with iodine is better than that with bromine, because the polarization of iodine is stronger than that of bromine. In spite of its high refractive index, the halogen-containing polymer is unstable under light or other conditions, and halogen has potential pollution to the environment, therefore, there still is room for improvement. Allcock et al. has reported a phosphorus-containing high refractive index polymer. The phosphorus-containing polymers such as polyphosphazene and polyphosphate have high refractive index, due to the high polarization of phosphorus. Some polyphosphazene materials have a refractive index of 1.664-1.755 and also have good transparency. Polyphosphate is similar to polyphosphazene in chemical structure, and have a refractive index of 1.60-1.64 and good thermal stability and melt processability. Ying feng Tu et al. has reported a high refractive index polymer containing a fullerene structure in a side chain. As an all-carbon structure, fullerene has excellent optical and electrical properties, and is a desirable photoelectric material. However, it is difficult to obtain a structurally controllable fullerene-containing polymer by free radical polymerization or anionic polymerization. They have prepared some polymers of different structure using polycondensation by pre-designing the side-chain fullerene structure and changing the structure of dicarbonylchloride middle group. The resulting fullerene side-chain polymer material has a refractive index of above 1.80. The research group of the present inventors has reported preparation of a selenium-containing hyperbranched polymer by copolymerization of selenide-containing styrene with styrene. Since a selenium-containing group is present in a side chain of the polymer, in spite of high refractive index ($>1.7$), the polymer has poor thermal stability and undesirable film-forming property.

Polyimide were firstly synthesized in the laboratory in 1908 by Marston Bogert by melt self-polycondensation of 4-aminophthalic anhydride. Du Pont filed a first patent application in the world on use of polyimide in materials in 1955, and developed a polyimide film under the trade name of kapton in 1961. In 1968, based on a chemical amination procedure, Amoco of US developed a "gel film formation method", obtaining a polyimide film having better performance. In the 21st century, more than 20 types of polyimides have been commercialized. Because of the excellent thermal, mechanical, optical and electrical properties, polyimide materials have great application value in high-tech fields such as national defense and military industry. They are mainly used as optical films, gas separation membranes, photoresists, polyelectrolyte materials and flexible electronic device materials. Ueda et al. has reported sulfur-containing polyimide materials of various structures, having a refractive index of 1.680-1.769, where the number of repeat units, aryl content and molecular volume are main factors affecting the refractive index value. These polyimide materials have high refractive index, excellent thermal, physical and mechanical properties, as well as low dielectric constant.

The research group of the present inventors has found by literature survey that the key for increasing the refractive index of a polymer lies in introduction of a group having high molar refractivity, low molar volume and high polarity. Currently, introduction of sulfur is a commonly used method for increasing the refractive index of a polymer material, especially a polyimide material. However, the resulting polyimide material has a limited increase of refractive index and also has low Abbe number, thereby limiting the application of such a material to some extent.

SUMMARY OF THE INVENTION

In order to solve the above technical problems, one object of the present invention is to provide a method for preparing selenium-containing polyimide with high refractive index and use of the selenium-containing polyimide. Selenium is introduced into the polyimide structure to effectively increase the refractive index of the polymer material and significantly increase the Abbe number.

In one aspect, the invention provides a selenium-containing polyimide polymer, and the polymer has the following general formula:

wherein, Ar is a selenide group, R is selected from the group consisting of an aromatic ring, an aromatic ring derivative, an aliphatic ring, and an aliphatic ring derivative, and $2 \leq n \leq 100$.

Preferably, R is selected from one of structural formulas:

Preferably, the selenide group has a general formula of: $Ar^1$—Se—$Ar^2$, $Ar^3$—Se—Se—$Ar^4$ or $Ar^5$—Se—$Ar^6$—Se—$Ar^7$—Se—$Ar^8$, wherein $Ar^1$ to $Ar^8$ are independently selected from the group consisting of a phenyl group, a phenyl derivative, a naphthyl group, a naphthyl derivative and a $C_2$-$C_{15}$ alkyl group.

More preferably, the selenide group is selected from one of structural formulas:

In another aspect, the invention also provides a method for preparing a selenium-containing polyimide polymer, the method comprises the steps of:

(1) polymerizing of a selenide diamine monomer of formula (II) with a dianhydride monomer of formula (III) in an organic solvent to give a selenium-containing polyamic acid of formula (IV);

wherein the resulting selenium-containing polyamic acid has a solid content of about 13-17%, and preferably 15%;

preferably, a molar ratio of the selenide diamine monomer to the dianhydride monomer is 1:0.8-1.2;

preferably, the reaction is carried out in an inert gas atmosphere, and the inert gas is preferably argon;

preferably, the organic solvent is selected from the group consisting of N, N-dimethylformamide (DMF), N, N-dimethylacetamide (DMAc), and methyl-pyrrolidone (NMP), and more preferably anhydrous DMF.

(2) performing thermal imidization on the selenium-containing polyamic acid of formula (IV) obtained in the step (1) to give a selenium-containing polyimide polymer of formula (V).

The reaction scheme is as follows:

wherein, Ar is a selenide group; R is selected from the group consisting of an aromatic ring, an aromatic ring derivative, an aliphatic ring and an aliphatic ring derivative; and $2 \leq n \leq 100$.

Preferably, in the step (1), the polymerization temperature is 20-40° C., and preferably 28-32° C.

Preferably, the temperature of thermal imidization is 60° C.-310° C., more preferably 70° C.-300° C.

more preferably, the thermal imidization is carried out under a gradient increased temperature from 70° C. to 300° C.

Still more preferably, the thermal imidization is performed at 70-75° C. for 40-80 min, at 95-105° C. for 40-80 min, at 145-155° C. for 40-80 min, at 195-205° C. for 70-100 min, at 215-255° C. for 70-100 min, and at 295-300° C. for 20-40 min.

Preferably, in the step (1), the selenide diamine monomer of formula (II) is 4, 4'-diamino diphenyl selenide, 4, 4'-diamino dinaphthyl selenide, 2, 2'-diamino dipropyl selenide, 6, 6'-diamino dihexyl selenide, 4, 4'-diamino diphenyl diselenide, 4, 4'-diamino dinaphthyl diselenide, 2, 2'-diamino dipropyl diselenide, 6,6'-diamino dihexyl diselenide, or the like.

Preferably, in the step (2), the dianhydride monomer of formula (III) is pyromellitic dianhydride, 4,4'-oxydiphthalic anhydride, 4, 4'-(hexafluoroisopropylidene)diphthalic anhydride, or cyclobutane tetracarboxylic dianhydride.

In a preferable embodiment, 4,4'-diamino diphenyl selenide is prepared by the following steps: a para-aniline compound of (I) is reacted with selenium at 105-135° C. in an organic solvent; the reaction is followed by TLC, a brown solid is obtained after the reaction is complete, the brown solid is reduced with $NaBH_4$, and a brown solid of 4,4'-diamino diphenyl selenide is obtained.

More preferably, the reaction is carried out in the presence of a catalyst and an activator in an inert atmosphere and away from light.

Preferably, the activator is a base such as $K_2CO_3$, $NaCO_3$, KOH or NaOH, and preferably $K_2CO_3$, and a molar ratio of the base to the para-aniline compound is 1:0.8-1.2.

Preferably, the inert gas is nitrogen, helium or argon, and preferably argon.

Preferably, the solvent is selected from the group consisting of dimethylsulfoxide (DMSO), dimethylformamide (DMF), toluene and any combination thereof, and preferably DMSO.

The reaction scheme is as follows:

wherein X is I, Br or Cl, and the corresponding catalysts are CuI, CuBr and CuCl respectively.

Preferably, a molar ratio of the para-aniline compound to selenium is 9-11:4-5.

In still another aspect, the invention further provides use of a selenium-containing polyimide polymer in an optical material, wherein the selenium-containing polyimide polymer has a refractive index value of 1.7-1.82.

By means of the above technical solutions, as compared with the prior art the present invention has the following advantages:

The present invention discloses a polyimide polymer material containing a selenide structure, selenium is introduced into the polyimide structure to effectively increase the refractive index and ultraviolet-absorption of the polymer material and significantly increase the Abbe number. The selenium-containing polyimide polymer is obtained by synthesis of a selenide diamine monomer and further polymerization with a dianhydride. It is found by tests that introduction of selenium into the polyimide can increase the refractive index, and thus greatly ameliorates the deficiency of low refractive index of the existing polyimide materials, thereby expanding its applications in the optics field.

In the present invention, two selenium-containing polyimide (PI) polymers (in the form of films) are obtained by synthesis and structural characterization of 4, 4'-diamino diphenyl selenide (BAPS) and further polycondensation with pyromellitic anhydride (PMDA) and 4,4'-oxydiphthalic anhydride (ODPA) respectively, followed by thermal imidization. The two polyimide films are compared with two common selenium-free polyimide films, and the resulting polyimide films are characterized in structure and properties by FTIR (Fourier Transform Infrared Spectroscopy), UV-vis (Ultraviolet-Visible Absorption Spectroscopy), DMA (Dynamic Mechanical Thermal Analysis), TGA (thermogravimetric analysis) and a spectroscopic ellipsometer. It has been found that the novel selenium-containing polyimides have increased refractive index of 1.712-1.818 and increased UV absorption without substantial changes in thermal stability. These preliminary explorations indicate that introduction of selenium can increase the refractive index and ultraviolet absorption of polyimides.

DETAILED DESCRIPTION OF THE PREFERRED EMBODIMENTS

The invention will be further illustrated in more detail with reference to the accompanying drawings and embodiments. It is noted that, the following embodiments only are intended for purposes of illustration, but are not intended to limit the scope of the present invention.

Test methods of properties in specific embodiments are as follows:

1. $^1$H NMR and $^{13}$C NMR, determined by a Bruker300 MHz NMR spectrometer wherein small analysis samples to be tested are dissolved in DMSO-$d_6$ solvent, and TMS (tetramethylsilane) is used as an internal standard;

2. $^{77}$Se NMR, determined by a Agilent 400 MHz NMR spectrometer;

3. elemental analysis, determined by a PerkinElmer 2400 CNH elemental analyzer;

4. small molecules MS, determined by a Bruker micro-TOF-QIII spectrometer wherein acetonitrile is used as a solvent;

5. FT-TR, determined by Bruker TENSOR 27 FT-IR, wherein polyamic acid is spin coated on a KBr pellet and thermal imidization is performed before testing;

6. UV-vis, determined by SHIMADZU UV-2600, wherein polyamic acid is evenly coated (15 μm) on a quartz slide, and treated by thermal imidization for film formation, and then inserted into an integrating sphere;

7. RI, determined by a spectroscopic ellipsometer, M2000, J. A. Woollam Co., to give $n_{TE}$ and $n_{TM}$ values, wherein polyamic acid is spin coated on a silicon wafer, and thermal imidization is performed for film formation. an average refractive index ($n_{av}$) is calculated using an equation $n_{av}^2=(2n_{TE}^2+n_{TM}^2)/3$, and a birefringence ($\Delta n$) is calculated using an equation $\Delta n=n_{TE}-n_{TM}$;

8. DMA, determined by TA Instrument DMAQ800, wherein a polymer film is cut into strips with a width of about 5 mm, a thickness of about 0.10 mm and a length of about 10 mm; and 9. TGA, determined in a $N_2$ atmosphere by PerkinElmer Pyris 1 TGA, wherein PI polymer films are minced, and the heating rate is 10° C./min.

Embodiment 1

Preparation of a Selenium-Containing Polyimide Polymer Film.

(1) Synthesis of selenide diamine monomer 4,4'-diamino diphenyl selenide (BASP) a 50 mL 3-neck flask was charged with argon for 2 hours to remove air, p-iodoaniline (10 mmol), CuI (1 mmol), $K_2CO_3$ (10 mmol) and DMSO (20 mL) were added into the 3-neck flask and stirred to dissolve p-iodoaniline, and dried selenium powder (6 mmol) was added into the reaction system, and the reaction temperature was previously set as 120° C. The reaction apparatus was protected from light and continuously charged with argon. The reaction process was followed by TLC, and after about 12 h, p-iodoaniline was essentially consumed. The reaction solution was naturally cooled, filtered by suction in the dark, washed with water, and extracted with ethyl acetate (40 mL×3). The organic phase was dried with anhydrous sodium sulfate, filtered by suction again, subjected to rotary evaporation to remove the solvent, and purified by column chromatography on silica gel (eluent: PE:EA=2:1), a brown solid was obtained. Then, the solid was reduced with $NaBH_4$, to give a brown solid again, namely, the desired product, 4, 4'-diamino diphenyl selenide (BASP).

Figure 1:
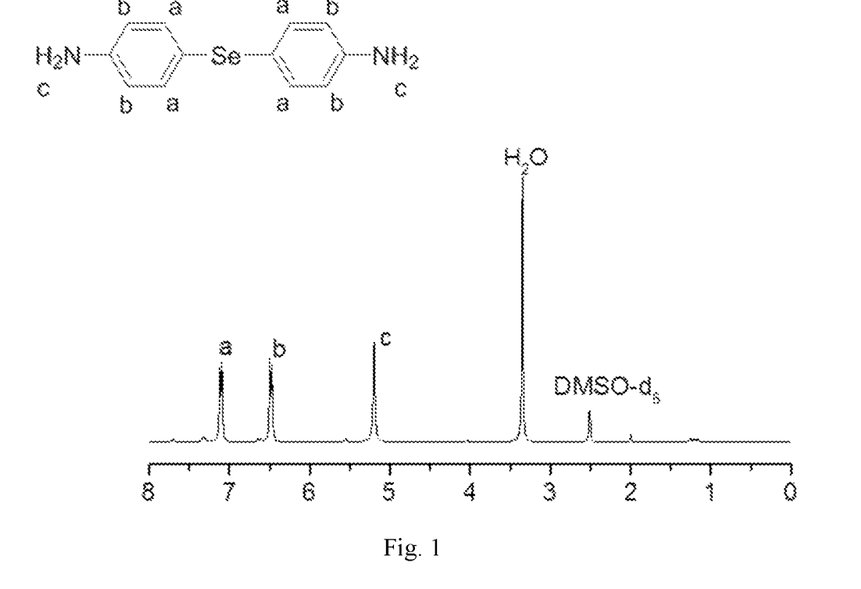
FIG. 1 shows $^1H$ NMR spectrum of 4, 4'-diamino diphenyl selenide in embodiment 1 of the present invention.
Figure 2:
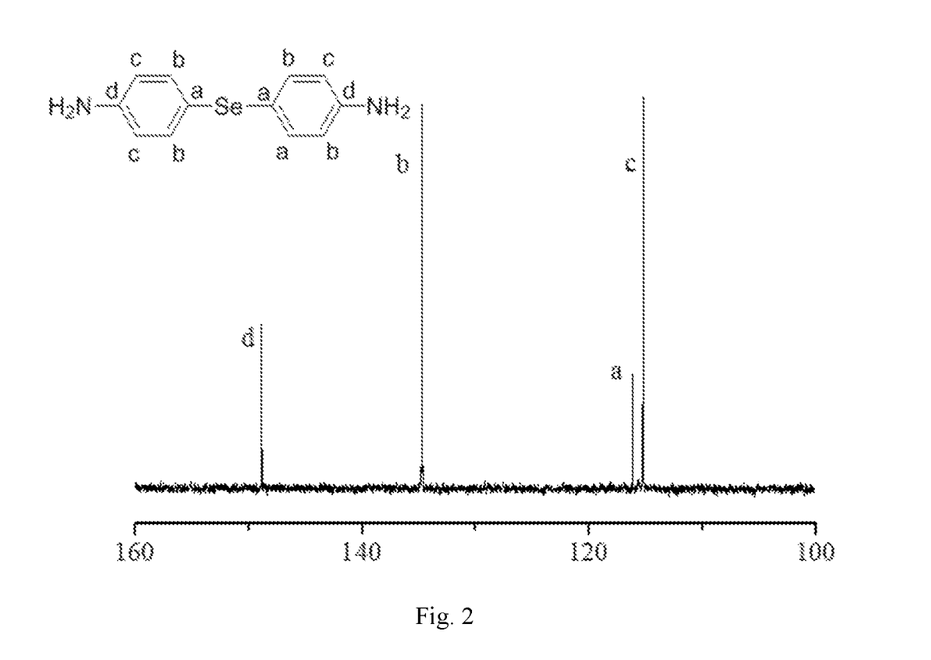
FIG. 2 shows $^{13}C$ NMR spectrum of 4, 4'-diamino diphenyl selenide in embodiment 1 of the present invention.
Figure 3:
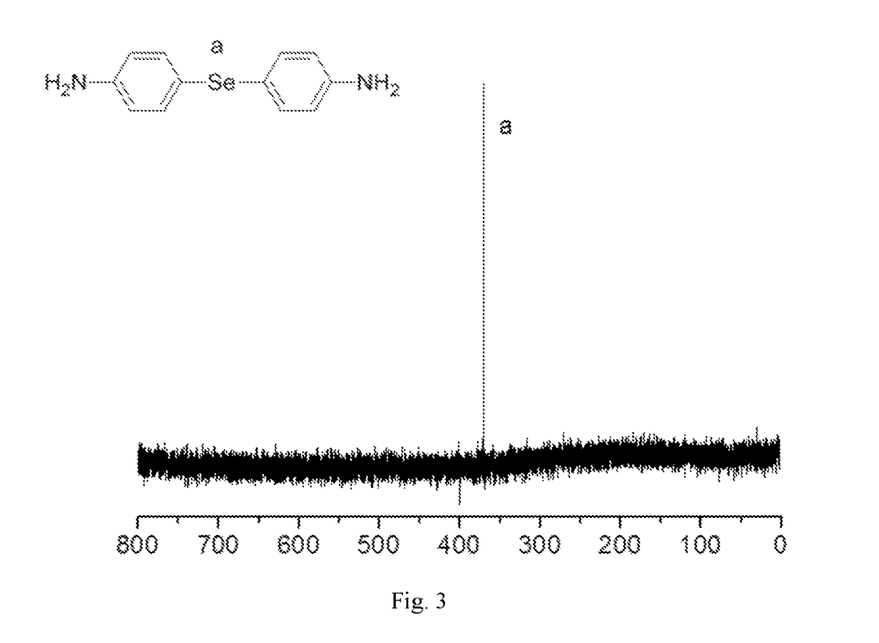
FIG. 3 shows $^{77}Se$ NMR spectrum of 4, 4'-diamino diphenyl selenide in embodiment 1 of the present invention.

FIGS. 1, 2 and 3 show $^1$H NMR spectrum, $^{13}$C NMR spectrum and $^{77}$Se NMR spectrum of the product 4, 4'-diamino diphenyl selenide, respectively.

Elemental analysis (%):
theoretical: C, 55.54; N, 10.61; H, 4.591; found: C, 55.16; N, 10.55; H, 4.502.
MS m/z: [M+H]$^+$ theoretical: 265.02, found: 265.0236.

(2) Preparation of Selenium-Containing Polyamic Acid
BASP (0.2640 g, 1 mmol) was dissolved into 3 mL anhydrous DMF, the resulting mixture was stirred in an argon atmosphere until BASP was completely dissolved, and argon was continually introduced for half one hour. A dianhydride monomer pyromellitic dianhydride (PMDA) (0.2189 g, 1 mmol) was then added. The reaction temperature was maintained at 30° C. and the reaction solution was stirred for 3 h, to give a selenium-containing polyamic acid PAA1 with a solid content of 15%.

(3) Preparation of Selenium-Containing Polyimide (PI) Film the selenium-containing polyamic acid PAA1 was rapidly coated on a glass plate for thermal imidization, and the following temperature program was carried out: heating at 70° C. for 1 h, at 100° C. for 1 h, at 150° C. for 1 h, at 200° C. for 1.5 h, at 250° C. for 1.5 h and at 300° C. for 0.5 h. After naturally cooling to room temperature, the glass plate was immersed into distilled water so that the resulting selenium-containing polyimide film PI1 (BASP/PDMA) was peeled off the surface of the glass plate.

Figure 4:
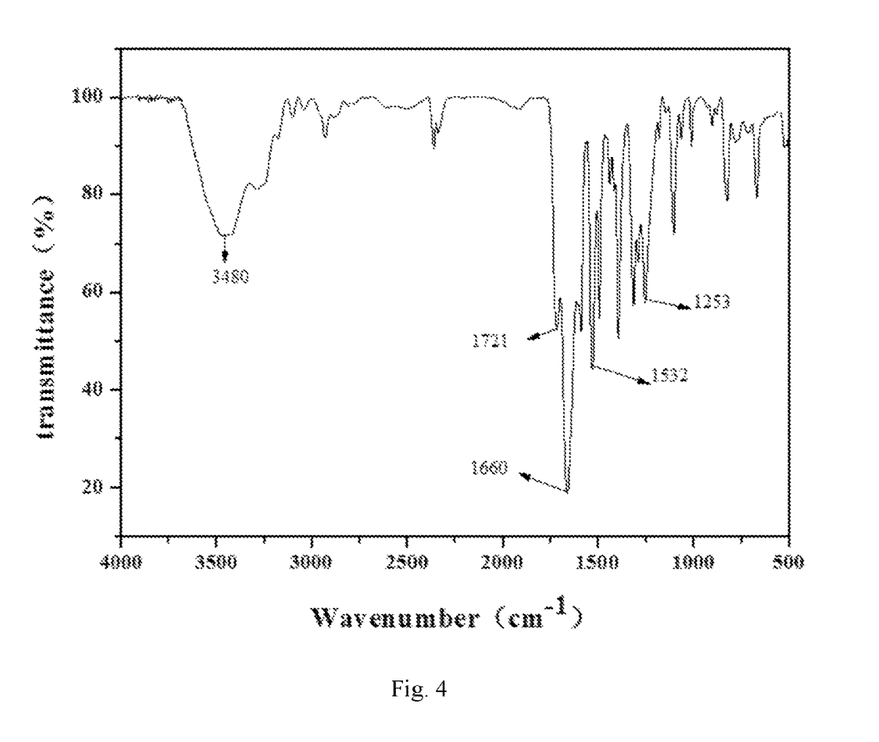
FIG. 4 shows IR spectrum of a selenium-containing polyamic acid PAA1 obtained by polymerization of 4, 4'-diamino diphenyl selenide with pyromellitic dianhydride in embodiment 1 of the present invention.
Figure 5:
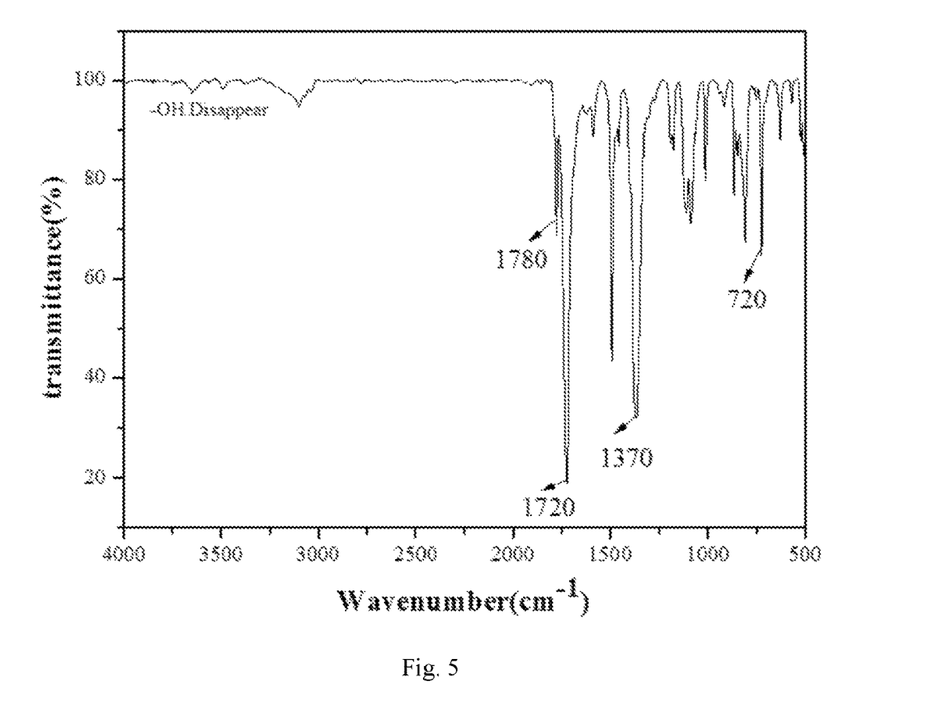
FIG. 5 shows IR spectrum of a selenium-containing polyimide film PI1 obtained by thermal imidization of the selenium-containing polyamic acid PAA1 in embodiment 1 of the present invention.

FIG. 4 shows IR spectrum of the selenium-containing polyamic acid PAA1 obtained in this embodiment. It can be seen that an apparent and wide absorption peak appears at 3480 cm$^{-1}$, which belongs to absorption of hydroxyl (—OH) in carboxyl (—COOH) contained in PAA; three absorption peaks appear at 1660 cm$^{-1}$, 1532 cm$^{-1}$ and 1253 cm$^{-1}$ respectively, which belong to characteristic absorption of amide structure (—CONH—); and an absorption peak appear at 1721 cm$^{-1}$, which belongs to characteristic absorption of carbonyl (—CO—). FIG. 5 shows IR spectrum of the selenium-containing polyimide film PI1 (BASP/PDMA) obtained in this embodiment. It can be seen that the initial strong absorption peak at 3480 cm$^{-1}$ disappears, and this indicates that, by means of thermal imidization, hydroxyl in the carboxyl structure participated in the reaction, and three new absorption peaks appear at 1720 cm$^{-1}$, 1370 cm$^{-1}$ and 720 cm$^{-1}$, corresponding to the characteristic absorption of imide. It is found by the above analysis that the polyimide structure is formed.

Embodiment 2

Figure 6:
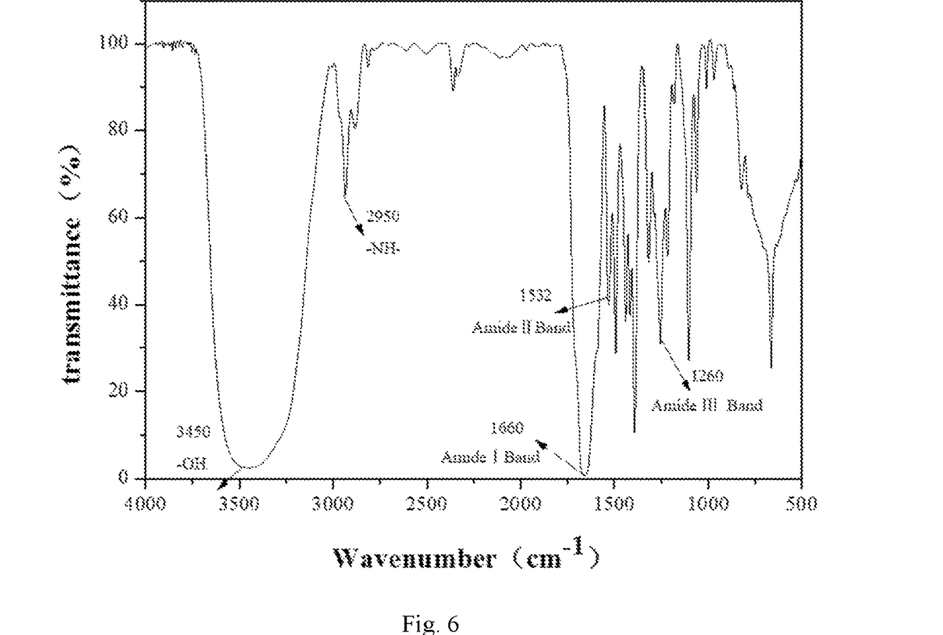
FIG. 6 shows IR spectrum of a selenium-containing polyamic acid PAA2 obtained by polymerization of 4, 4'-diamino diphenyl selenide with 4, 4'-oxydiphthalic anhydride in embodiment 2 of the present invention.
Figure 7:
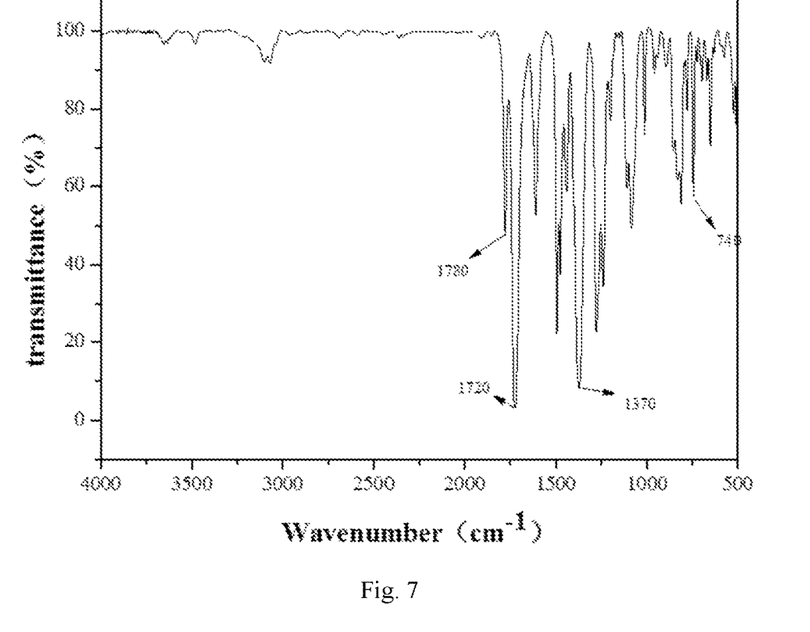
FIG. 7 shows IR spectrum of a selenium-containing polyimide film PI2 obtained by thermal imidization of the selenium-containing polyamic acid PAA2 in embodiment 2 of the present invention.

The steps of embodiment 2 were substantially the same as those in the embodiment 1, except that in the step (2), the dianhydride monomer was 4,4'-oxydiphthalic anhydride (ODPA), to give a selenium-containing polyamic acid PAA2; and in the step (3), the selenium-containing polyamic acid PAA2 was subjected to thermal imidization, to give a selenium-containing polyimide film PI2 (BASP/ODPA). FIG. 6 shows IR spectrum of the selenium-containing polyamic acid PAA2 obtained in this embodiment 2. It can be seen that an apparent and wide absorption peak appears at 3450 cm$^{-1}$, which belongs to absorption of hydroxyl (—OH) in carboxyl (—COOH) contained in PAA; and three absorption peaks appear at 1660 cm$^{-1}$, 1532 cm$^{-1}$ and 1260 cm$^{-1}$ respectively, which belong to characteristic absorption of amide structure (—CONH—). FIG. 7 shows IR spectrum of the selenium-containing polyimide film PI2 (BASP/ODPA) obtained in this embodiment. It can be seen that the initial strong absorption peak at 3450 cm$^{-1}$ disappears, and this indicates that, by means of thermal imidization, hydroxyl in the carboxyl structure participated in the reaction; and three new absorption peaks appear at 1720 cm$^{-1}$, 1370 cm$^{-1}$ and 740 cm$^{-1}$, corresponding to the characteristic absorption of imide. It is found that by the above analysis that the polyimide structure is formed.

Comparative embodiments are provided below.

Embodiment 3

Preparation of Selenium-Free Polyimide Polymer Film.

(1) Preparation of Polyamic Acid 4, 4'-oxydianiline (ODA) (0.2640 g, 1 mmol) was dissolved into 3 mL anhydrous DMF, the resulting mixture was stirred in an argon atmosphere until ODA was completely dissolved, and argon was continually introduced for half one hour. A dianhydride monomer pyromellitic anhydride (PMDA) (0.2189 g, 1 mmol) was then added. The reaction temperature was maintained at 30° C. and the reaction solution was stirred for 3 h, to give a polyamic acid PAA3 with a solid content of 15% by controlling the dosing ratio.

(2) Preparation of Polyimide (PI) Film the polyamic acid PAA3 was rapidly applied on a glass plate for thermal imidization, and the following temperature program was performed: heating at 70° C. for 1 h, at 100° C. for 1 h, at 150° C. for 1 h, at 200° C. for 1.5 h, at 250° C. for 1.5 h and at 300° C. for 0.5 h. After naturally cooling to room temperature, the glass plate was immersed into distilled water so that the resulting polyimide film PI3 (ODA/PDMA) was peeled off the surface of the glass plate.

Embodiment 4

The steps in this embodiment 4 were substantially the same as those in embodiment 3, except that in the step (1), the dianhydride monomer 4, 4'-oxydiphthalic anhydride (ODPA) was added to give a polyamic acid PAA4; and in the step (3), the polyamic acid PAA4 was subjected to thermal imidization, to give a polyimide film PI4 (ODA/ODPA).

Property tests are performed on the above four polymer films PI1 (BASP/PDMA), PI2 (BASP/ODPA), PI3 (ODA/PDMA) and PI4 (ODA/ODPA).

1. Solubility of Polymer Films

TABLE 1

Solubility of four polyimide films in common organic solvents

| Sample | DMSO | THF | CHCl$_3$ | DMAc | NMP | DMF | Acetone | m-Cresol |
|---|---|---|---|---|---|---|---|---|
| PI1 | — | — | — | — | — | — | — | — |
| PI2 | — | — | — | — | — | — | — | — |
| PI3 | — | — | — | — | — | — | — | — |
| PI4 | — | — | — | — | — | — | — | — |

Relative solubility of 10 mg of each sample in 1 mL solvent is shown in the above Table 1 ("−" denotes insoluble at normal temperature; "+" denotes soluble at normal temperature). Taking testing solubility of a polymer film (PI) in DMSO as an example, 2 mg of each of four polyimide films obtained (about 20 μm in thickness) was cut into small segments, and placed into a bottle containing 2 mL DMSO at normal temperature. After stirring for 2 h at normal temperature, it was found that four PIs were all insoluble in DMSO. Solubility of four PIs in the other organic solvents listed in Table 1 was tested by the same process, and it was found that four PIs were also insoluble at normal temperature. This is because the backbone molecules of these four PIs are highly rigid, so that the chains have poor flexibility. The backbone structures cannot stretch in the organic solvents, resulting in insolublility. As a result, these four PIs have solvent resistance, and can be used in the above organic solvent environments without affecting the properties of PIs. However, in some other fields, it is necessary for PIs to be soluble in common organic solvents, and this is generally achieved in two ways: (1) decrease in rigidness or regularity of backbones, for example, by polymerizing an aliphatic diamine with an aliphatic dianhydride to obtain PIs; and (2) decrease in density of imide ring in backbones, for example, by reducing the molecular weight of PIs. One of the most commonly used ways is to introduce fluorine element in the diamine or dianhydride monomer for increasing the solubility of PIs, and the optical properties of fluorine-containing PIs could be improved.

2. Thermal Stability of Polymer Films

Figure 8:
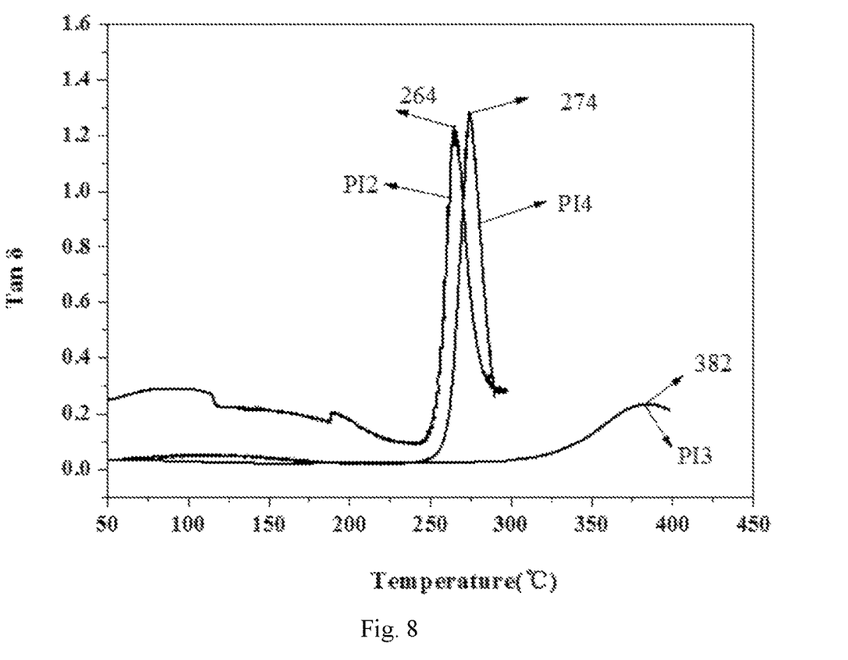
FIG. 8 shows DMA curves of four polyimide films respectively obtained in embodiments 1, 2, 3 and 4 of the present invention.

Thermal stability of a polymer film was characterized by DMA and TGA curves. FIG. 8 shows DMA curves of four polymer films. The test frequency is 1 Hz. The curve of PI1 is not available, because the strong rigidity of backbone of PI1 and instability due to selenium results in that a continuous film cannot be formed from PAA1 during the thermal imidization, and thus the DMA test is not carried out. It can be seen from the DMA curves of PI2, PI3 and PI4 that their glass transition temperatures (Tg) are 264° C., 382 C.° and 274° C. respectively. It is found by comparing PI2 with PI4 that both have the same structure except that the contents of selenium and oxygen in the diamine monomer are different. However, although instability of selenium element at a high temperature results in that the Tg of PI2 is slightly lower than that of PI4, the whole property of PI2 is not affected. As one of the most commonly used polyimides, PI3 is obtained by polymerization of ODA and PMDA and has a very large rigidity in the backbone, so that its Tg is far higher than that of two other PIs.

Figure 9:
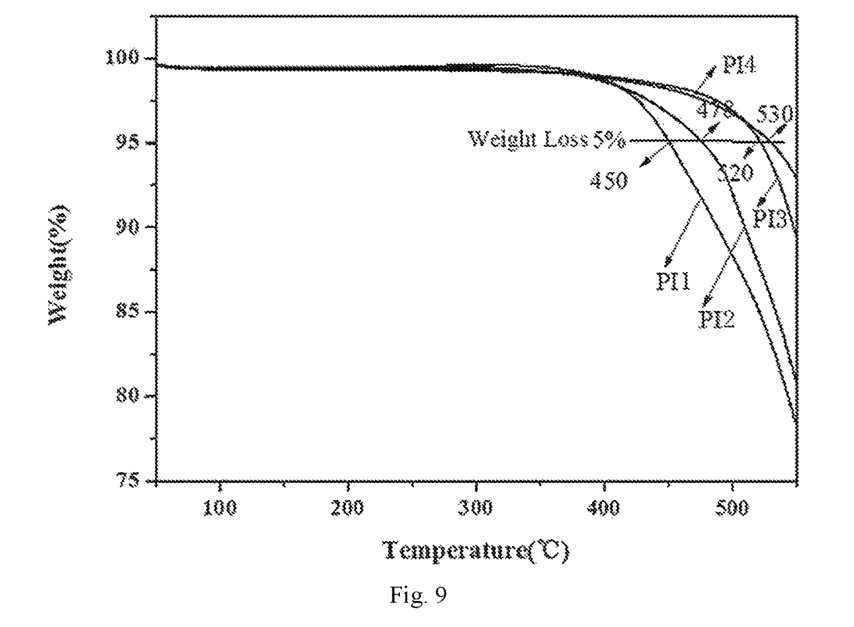
FIG. 9 shows TGA curves of four polyimide films respectively obtained in embodiments 1, 2, 3 and 4 of the present invention.

FIG. 9 shows TGA curves of four polyimide films, in which the temperature range is 50-600° C. It can be seen from the FIG. 9 that the initial decomposition temperatures of four films are all above 350° C., and this indicates that the material can be used for a long term at a high temperature. The temperatures with 5% weight loss are 450° C. for PI1, 478° C. for PI2, 520° C. for PI3 and 530° C. for PI4 respectively. Although PI1 and PI3 have a similar structure and PI2 and PI4 have a similar structure, due to the presence of selenium element, PI1 and PI2 are instable and labile at a high temperature so that the decomposition temperature is decreased. However, the thermal stability is not affected, and the rigid structure in the PI backbone has a great influence on glass transition temperature and decomposition temperature.

3. Optical Properties of Polymer Films

It is found by observation of the obtained four PI films that they all have colors and the color depths are different, that is, the four polyimides have different optical transmittances. Charge transfer (CT) between an electron donating diamine monomer and an electron accepting dianhydride monomer is responsible for coloring of common polyimides.

Figure 10:
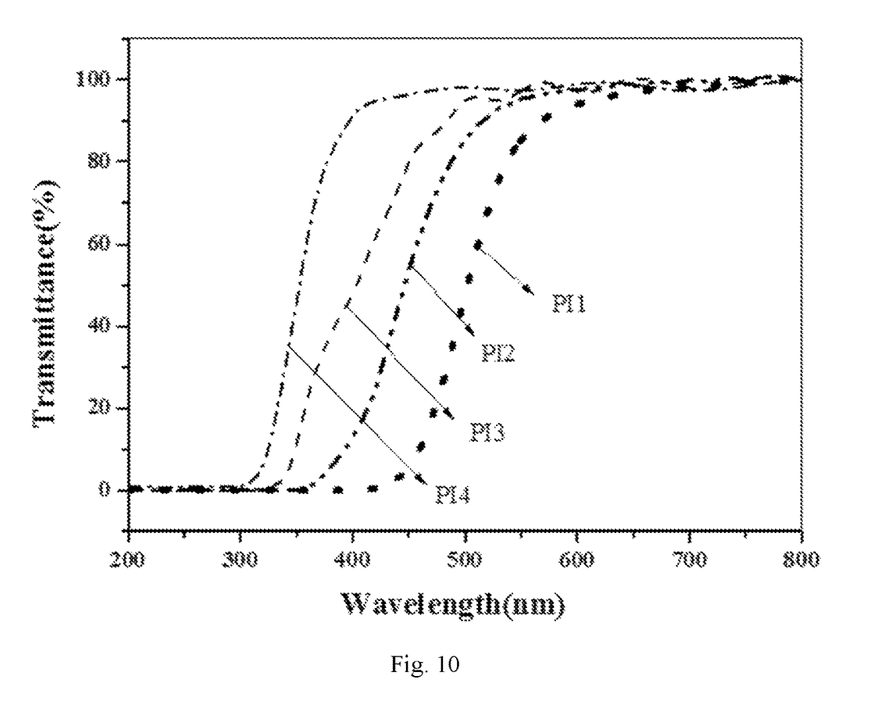
FIG. 10 shows UV-vis spectra of four polyimide films respectively obtained in embodiments 1, 2, 3 and 4 of the present invention.

FIG. 10 shows UV-vis spectra of four polyimide films. It can be seen from the FIG. 10 that transmittances of four PIs at a wavelength of above 600 nm are nearly 100%. Transmittances of PI1 and PI2 then start to decrease rapidly and are nearly 0 at a wavelength of 400 nm, with cutoff wavelengths ($\lambda_0$) of 426 nm and 362 nm, respectively. Transmittances of PI3 and PI4 reach 0 until the wavelength is around 300 nm, with cutoff wavelengths of 329 nm and 299 nm, and the transmittances in the visible light region (400-800 nm) are nearly 100%. This indicates that PI3 and PI4 have much better transmittances than those of PI1 and PI2 in the visible light region. However, we found that transmittances of PI1 and PI2 in the UV light region are nearly 0, and thus they can be used as UV resistant materials. Sometimes, it is necessary to use a transparent polyimide material in a particular field, and generally, a fluorine-containing group such as —$CF_3$ is introduced into the polyimide backbone to weaken the CT effect, thereby decreasing the color depth of PIs.

TABLE 2

Optical properties of four polyimides

| Sample | Transmittance | | RI(n)$^c$ | | | | |
|---|---|---|---|---|---|---|---|
| | $T_{400}$ (%)$^a$ | $\lambda_0$ (nm)$^b$ | $n_{TE}$ | $n_{TM}$ | $n_{av}$ | $\Delta n$ | $V_D$ |
| PI1 | 0.135 | 426 | 1.756 | 1.707 | 1.740 | 0.049 | 12.44 |
| PI2 | 12.88 | 362 | 1.829 | 1.796 | 1.818 | 0.033 | 18.10 |
| PI3 | 47.96 | 329 | 1.743 | 1.655 | 1.714 | 0.088 | 15.83 |
| PI4 | 91.07 | 299 | 1.724 | 1.689 | 1.712 | 0.035 | 18.07 |

Figure 11:
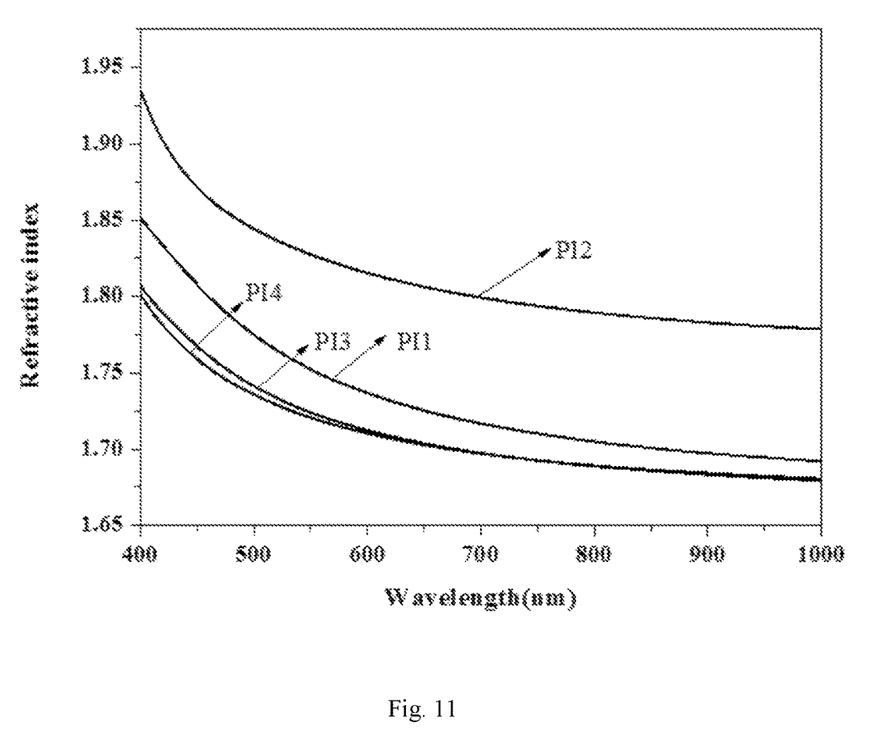
FIG. 11 shows refractive index values at different wavelengths of four polyimide films respectively obtained in embodiments 1, 2, 3 and 4 of the present invention.

As shown in Table 2 (in the table, $T_{400}(\%)^a$ denotes the transmittance at 400 nm, $\lambda_0$ (nm)$^b$ denotes cutoff wavelength of UV-vis, and RI (n)$^c$ denotes refractive index at 589 nm), an in-plane refraction index ($n_{TE}$), an out-plane refraction index ($n_{TM}$), an average refraction index ($n_{av}$) and birefringence ($\Delta n$) of these four polyimide films are summarized. FIG. 11 shows refractive index values of four polyimide films at different wavelengths, and $n_m$ and $n_{TM}$ values of these four polyimide films at 589 nm are 1.724-1.829 and 1.655-1.796 respectively. It can be seen from four PIs that $n_m$ values are all slightly larger than $n_{TM}$ values, and this indicates that the backbone is in a preferential arrangement parallel to the plane of the film. The $n_{av}$ values of PI1 and PI2 are 1.740 and 1.818 respectively, which are both larger than the corresponding values of PI3 and PI4 which are 1.714 and 1.712 respectively. The $n_{av}$ values depend on the characteristics of the diamine monomer and dianhydride monomer, $n_{av}$ of PI1 is larger than $n_{av}$ of PI3, and $n_{av}$ of PI2 is larger than $n_{av}$ of PI4. This is because, according to the classical electromagnetic theory, a refractive index of a material is highly related to a molar refraction of material molecules. For a similar molecular structure, a material containing a high-molar-refraction structure has a larger refractive index. Both the diamine groups in PI1 and PI2 contain a high molar refraction of —Se—, and thus the refractive indexes of PI1 and PI2 are larger than those of the corresponding PI3 and PI4 respectively.

The refractive index anisotropy is regarded as birefringence. This is one important parameter of materials for use in prisms and light guides, and a large birefringence may lead to aberrations. By comparisons between PI1 and PI3 and between PI2 and PI4, it is found that introduction of a selenium-containing group may also decrease birefringence. Abbe number $V_D$ is calculated by an equation $V_D=(n_D-1)/(n_F-n_C)$, in which $n_D$, $n_F$ and $n_C$ represent D line (589 nm), F line (486 nm) and C line (563 nm) respectively. Smaller $V_D$ value represents higher wavelength dispersion, and larger $V_D$ value represents lower wavelength dispersion. The $V_D$ values of PI1 and PI2 are 12.44 and 18.10 respectively, and the $V_D$ values of PI3 and PI4 are 15.83 and 18.07 respectively, and this indicates that selenium element has no substantial effect on $V_D$ values of PIs. The refractive index and the Abbe number need to be balanced, because optical absorption in the UV-vis region results in increased refractive index at a short wavelength of visible light. The Abbe numbers of PIs reported herein are small, and this indicates that large wavelength dispersion occurs for high refractive index materials.

The above description is only preferred embodiments of the present invention and not intended to limit the present invention, it should be noted that those of ordinary skill in the art can further make various modifications and variations without departing from the technical principles of the present invention, and these modifications and variations also should be considered to be within the scope of protection of the present invention.

What is claimed is:

1. A selenium-containing polyimide polymer, having a general formula of:

wherein,
Ar is a selenide group;
R is a 1, 2, 4, 5-tetrasubstituted benzene ring or a tetrasubstituted cyclobutane ring; and
$2 \leq n \leq 100$.

2. The selenium-containing polyimide polymer as claimed in claim 1, wherein the selenide group has a general formula of: $Ar^1$—Se—$Ar^2$, $Ai^3$-Se—Se—$Ar^4$ or $Ar^5$—Se—$Ar^6$—Se—$Ar^7$—Se—$Ar^8$, and AO to AO being independently selected from the group consisting of a phenyl group, a phenyl derivative, a naphthyl group, a naphthyl derivative and a $C_2$-$C_{15}$ alkyl group.

3. A method for preparing a selenium-containing polyimide polymer of claim 1, comprising the steps of:
   (1) polymerizing a selenide diamine monomer of formula (II) with a dianhydride monomer of formula (III) in an organic solvent to give a selenium-containing polyamic acid of formula (IV); and
   (2) performing thermal imidization on the selenium-containing polyamic acid of formula (IV) obtained in the step (1) to give a selenium-containing polyimide polymer of formula (V);
   the reaction scheme being as follows:

-continued (IV)

(V)

wherein 2≤n≤100;
R is a 1, 2, 4, 5-tetrasubstituted benzene ring or a tetrasubstituted cyclobutane ring; and
Ar is a selenide group.

4. The method as claimed in claim 3, wherein in the step (1), the polymerization temperature is 20-40° C.

5. The method as claimed in claim 3, wherein in the step (2), the temperature of thermal imidization is 60° C.–310° C.

6. The method as claimed in claim 3, wherein in the step (1), the selenide diamine monomer of formula (II) is 4,4'-diamino diphenyl selenide, 4, 4'-diamino dinaphthyl selenide, 2, 2'-diamino dipropyl selenide, 6, 6'-diamino dihexyl selenide, 4, 4'-diamino diphenyl diselenide, 4, 4'-diamino dinaphthyl diselenide, 2, 2'-diamino dipropyl diselenide or 6, 6'-diamino dihexyl diselenide.

7. The method as claimed in claim 3, wherein in the step (2), the dianhydride monomer of formula (III) is pyromellitic dianhydride or cyclobutane tetracarboxylic dianhydride.

8. The method as claimed in claim 6, wherein the preparation method of 4,4'-diamino diphenyl selenide comprises the steps of:
reacting a para-aniline compound of (I) with selenium at 105-135° C. in an organic solvent; and
performing reduction on the resulting product after the reaction is complete, giving 4,4'-diamino diphenyl selenide,
the reaction scheme being as follows:

wherein X is I, Br or Cl.

9. The method as claimed in claim 8, wherein a molar ratio of the para-aniline compound to selenium is 9-11:4-5.

10. An optical material comprising the selenium-containing polyimide polymer of claim 1, wherein the selenium-containing polyimide polymer has a refractive index of 1.7-1.82.

* * * * *